United States Patent

Behrendt et al.

[11] Patent Number: 5,167,683
[45] Date of Patent: Dec. 1, 1992

[54] INTAKE AIR FILTER FOR THE INTERNAL COMBUSTION ENGINE OF A MOTOR VEHICLE

[75] Inventors: Bernhard Behrendt, Beilstein; Heinz Benzler, Kirchberg/Murr; Volker Ernst, Sachsenheim, all of Fed. Rep. of Germany

[73] Assignee: Filterwerk Mann & Hummel GmbH, Ludwigsburg, Fed. Rep. of Germany

[21] Appl. No.: 740,575

[22] Filed: Aug. 6, 1991

[30] Foreign Application Priority Data

Aug. 6, 1990 [DE] Fed. Rep. of Germany ....... 4024898

[51] Int. Cl.$^5$ ............................................. B01D 46/00
[52] U.S. Cl. ........................................ 55/478; 55/498; 55/502
[58] Field of Search .................. 55/337, 498, 502, 478, 55/357; 210/493.2

[56] References Cited

U.S. PATENT DOCUMENTS

| | | | |
|---|---|---|---|
| 4,349,363 | 9/1982 | Patel et al. | 55/498 |
| 4,720,292 | 1/1988 | Engel et al. | |
| 5,071,456 | 12/1991 | Binder et al. | 55/502 |

FOREIGN PATENT DOCUMENTS

| | | |
|---|---|---|
| 1099220 | 4/1981 | Canada. |
| 7321762 | 3/1974 | Fed. Rep. of Germany. |
| 2824280 | 12/1978 | Fed. Rep. of Germany. |
| 3838540 | 5/1990 | Fed. Rep. of Germany ........ 55/498 |
| 1379165 | 10/1964 | France. |

*Primary Examiner*—Bernard Nozick
*Attorney, Agent, or Firm*—Foley & Lardner

[57] ABSTRACT

An air intake filter for the internal combustion engine of a motor vehicle in which a substantially cylindrical housing contains an annular filter insert through which the air flows radially from the outside to the inside. At one end of the housing an end opening of the filter insert sealingly engages a tubular projection which communicates with the clean air outlet so that the filter insert is centered within the housing. At its opposite end, the filter insert is closed by a cover and is provided with fastening elements which engage in the junction between the housing and the cover, so that the fastening of the cover to the housing simultaneously serves to axially and radially secure the filter insert in place. Alternatively, the cylindrical housing may be formed of two, semicylindrical half-shells, and the filter insert may be provided with an annular bead which mates with a corresponding indentation in the housing to assure proper installation of the filter insert.

11 Claims, 3 Drawing Sheets

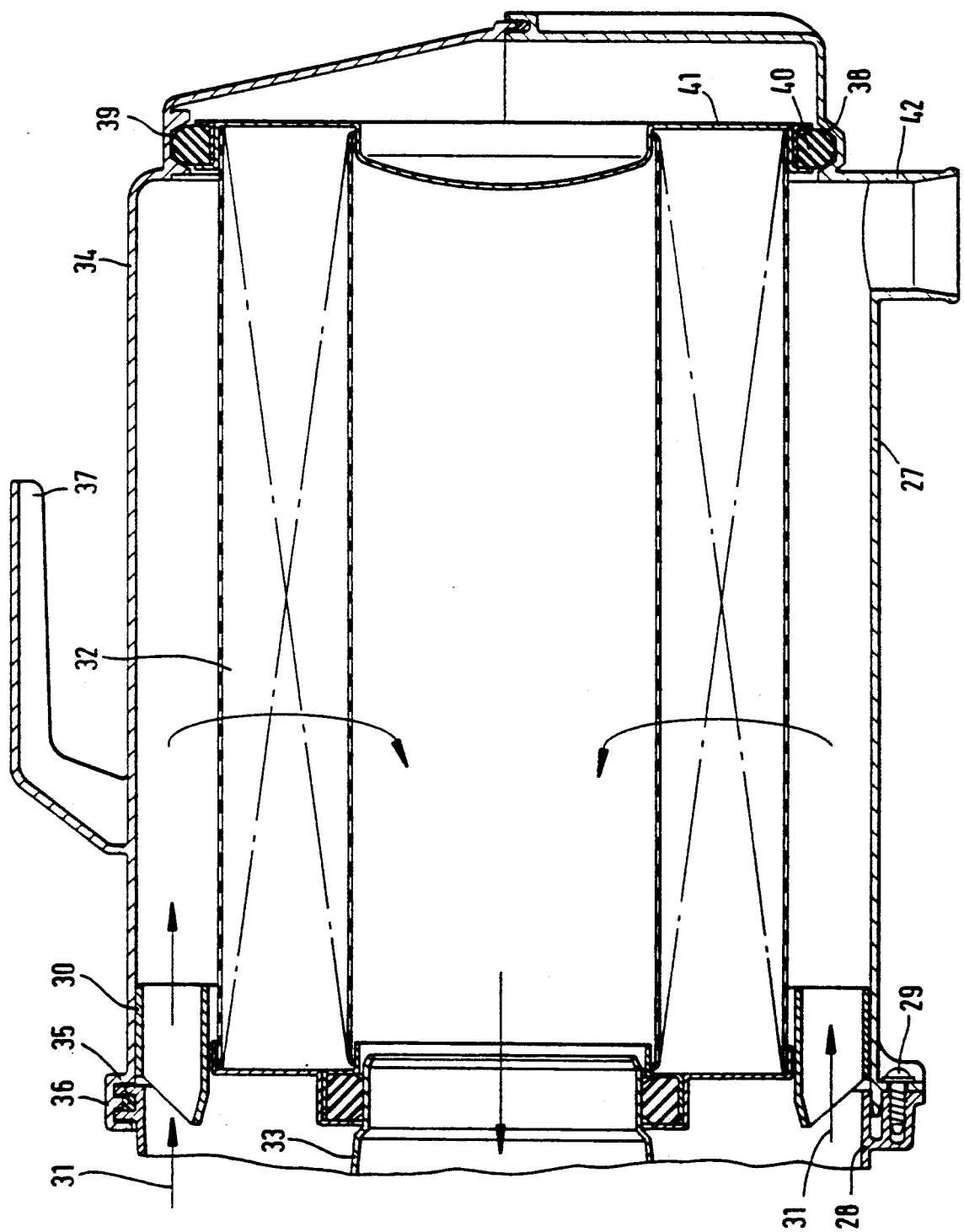

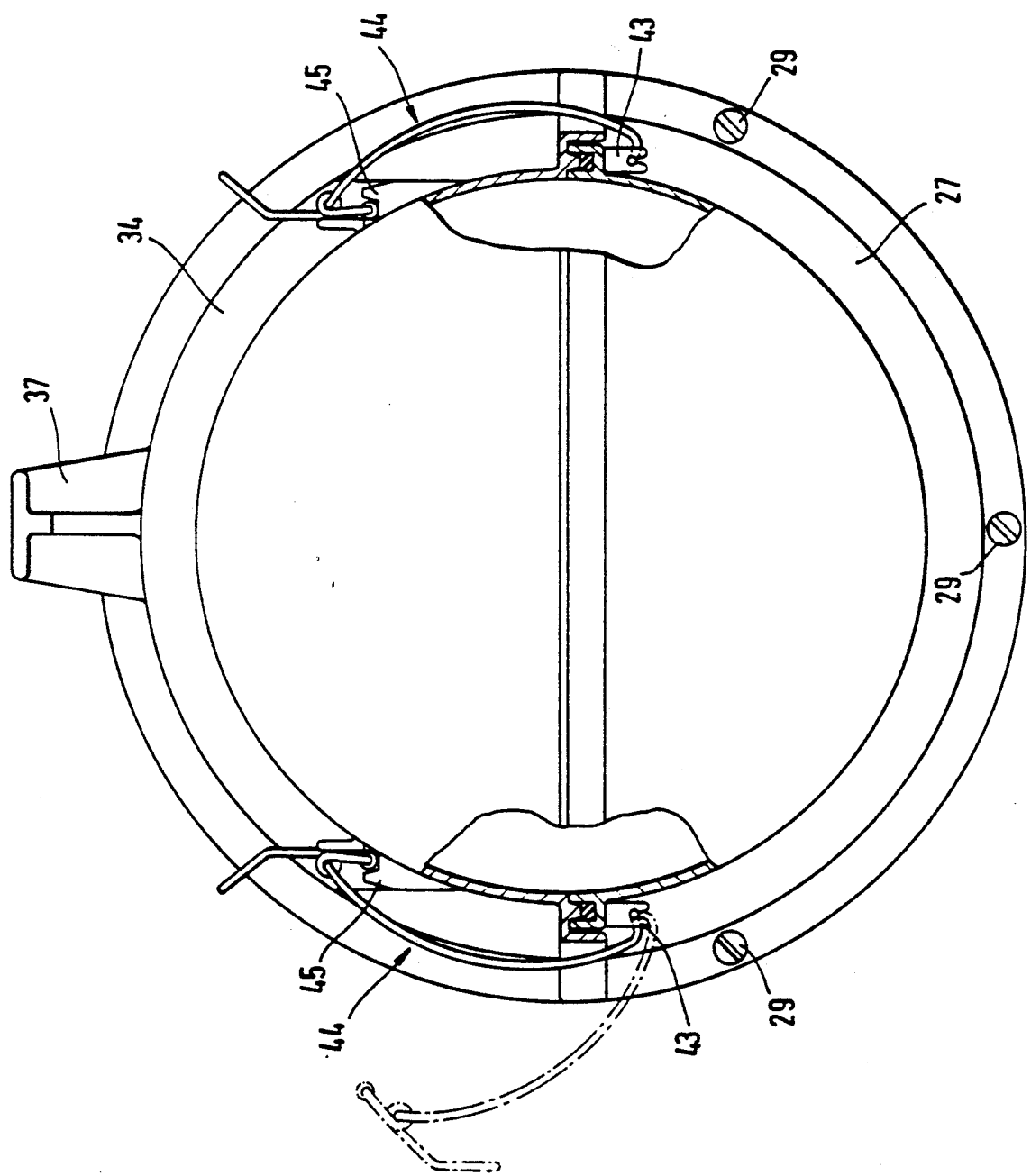

INTAKE AIR FILTER FOR THE INTERNAL COMBUSTION ENGINE OF A MOTOR VEHICLE

BACKGROUND OF THE INVENTION

This invention relates to an intake air filter for the internal combustion engine of a motor vehicle, in which An intake air filter of this type is disclosed in Engel et al., U.S. Pat. No. 4,720,292. It comprises a cylindrical housing which has an inlet opening for unfiltered air on its circumference, and which is provided with an outlet for filtered air on one end face. A cartridge or filter insert is arranged inside the housing. This filter insert extends over the entire axial length of the housing and has at its end facing the clean air outlet a gasket which lies directly adjacent the end face of the housing. A tubular projection extends into the interior of the housing. The filter insert is additionally supported on this projection, thus securing the filter insert radially within the housing. The housing is closed at the end opposite the air outlet by a cover. The cover also serves to exert a force on the filter insert toward the air outlet and thus holds the filter insert in its installed position. The axial position of the filter insert is thus directly fixed by the cover.

This construction necessitates very high accuracy both in the length of the filter insert and in the length of the housing, so that a uniform force is always exerted on the filter insert and there is no danger that the filter insert can move in the axial direction and possibly become displaced. Since no guidance is provided on the housing for the filter insert, the insert can become skewed when installed and can be clamped in a skewed position by the cover. The result will be that a proper seal between the raw air space and the clean air space will no longer exist, so that dust-laden air can enter the clean air space and thence into the motor.

Another intake air filter for internal combustion engines, compressors and other air-aspirating machines is disclosed in German Utility Model No. DE-G 73-21,762. This filter has two filter inserts and is provided with a central threaded bolt anchored in the clean air tube which serves to fasten the filter inserts in place. This bolt is passed through the openings into the cover disks of the filter and tightens the filter inserts axially against the housing parts by means of nuts threaded on it. To fix the filter inserts in correct position, abutments are provided on the bolt and the cover disks lie on the abutments. This fastening arrangement requires a very high accuracy of the abutments with respect to the surface on which the filter inserts lie in the housing. Furthermore, high accuracy in the length of the filter inserts is also required in order to assure reliable sealing of the end face of the filter insert that lies adjacent the clean-air outlet. This need for high accuracy leads to an unreasonably high cost of the filter inserts which must be frequently replaced.

Another disadvantage of the threaded bolt arrangement is that the bolt has to be fastened within the air outlet on the clean air side. If the housing is made of sheet metal, this may be possible, for example, by spot welding. If the housing is made of plastic and the clean air outlet in integrated into the housing, a threaded bolt can be fastened to the housing only if additional reinforcing ribs, embedded metal pieces, or and the like are provided.

Even in the case of a very complex design, there is a danger that the creep characteristic of the plastic over a long period of time might cause the holding force on the filter insert to diminish, so that the seal between the raw air side and the clean air side is at risk due to the possibility of an unnoticed loosening of the filter insert.

SUMMARY OF THE INVENTION

It is the object of the invention to provide an intake air filter in which filter inserts can be fastened in a simple and reliable manner.

Another object of the invention is to provide an intake air filter with a plastic housing which assures a reliable and durable seal between the raw air and clean air sides of the filter.

A further object of the invention is to provide an intake air filter for an internal combustion engine which overcomes the aforementioned disadvantages of the prior art.

These and other objects of the invention are achieved by providing an air intake filter for an internal combustion engine, which comprises a substantially cylindrical housing having a raw air inlet at one side thereof and a clean air outlet at one end face thereof, at least one annular filter insert disposed in the housing through which air flows radially from the outside to the inside, and a cover for closing the other end face of the housing thereby forming a junction between the housing and the cover, wherein the filter insert has a clean air opening at one end thereof adjacent the housing air outlet which sealingly engages a tubular projection on the housing communicating with the housing air outlet, the filter insert being closed at its opposite end by the cover; and wherein the filter insert at the opposite end comprises at least one fastening element engaged by the junction between the housing and the cover, whereby the filter insert is secured axially and radially in place by fastening the cover to the housing.

According to a further aspect of the invention, the objects are achieved by providing an air intake filter for an internal combustion engine, which comprises a substantially cylindrical housing having a raw air inlet at one side thereof and a clean air outlet disposed at one end face thereof, and at least one annular filter insert disposed within the housing through which air flows radially from the outside to the inside, wherein the housing is composed of first and second half-shells joined by releasable latch means, the first half-shell carrying the one end face with the clean air outlet, and the a second half-shell forming a cover, wherein the housing has an annular indentation formed interiorly in the first and second half-shells extending around the entire circumference of the housing proximate the air outlet end, and the filter insert is provided with an annular bead extending around its entire circumference which engages the annular indentation to secure the filter insert radially and axially within the housing; the indentation and annular bead being arranged such that if the filter element is incorrectly installed, they will prevent closure of the cover.

An important advantage of the invention is that, due to the configuration of the filter insert and the fact that the filter insert is fastened at the junction between the housing and the cover, secure fastening of the filter insert is assured even in the event of very severe vibration or shaking movements. It is not possible for the filter insert to become skewed upon installation or replacement, since if the filter insert is skewed the cover cannot be attached to the housing. This manner of fastening the filter insert additionally provides a control of the correct installation of the filter insert.

The aforementioned advantages are also achieved by an alternative arrangement according to the invention in which the filter insert is provided with an annular bead which mates with an annular indentation formed in the cylindrical housing. In this alternative case, it is likewise only possible to close the cover when the filter insert is in its correctly installed position.

This alternative embodiment has the additional advantage that it is not necessary to have a large axial movement space in order to remove the filter insert. Instead this filter insert need only be slightly displaced axially and then it can be lifted up and out of the housing. This is advantageous, especially where there is little space available for the installation of an air intake filter.

In accordance with a particularly preferred embodiment of the invention, it is proposed that the means for fastening the filter insert comprise tabs which are pointed outwardly in the shape of a star from the front of the filter insert and which are engaged in the junction between the housing and the cover. Instead of such tabs, the filter insert can alternatively be provided at its front end with a cover plate having a diameter which is sufficiently large that it extends to the junction between housing and the cover and thus engages the mounting groove on the housing.

In accordance with a further preferred embodiment of the invention, snap-hook fasteners are provided for joining the housing and cover together. These fasteners can be operated without tools and are additionally capable of compensating for slight positional and/or dimensional inaccuracies.

In order to seal the filter insert at its face confronting the air outlet, a radial gasket fastened to the filter insert is arranged to contact the outlet tube of the housing. Such a radial gasket provides a secure and reliable seal. Furthermore, this has the advantage that inaccuracies in the length of the filter insert or of the housing do not affect the seal between the filter insert and housing. Such gaskets also are capable of sustaining their sealing action even under extreme temperature conditions, temperature fluctuations, and/or vibration and shock conditions.

BRIEF DESCRIPTION OF THE DRAWINGS

The invention will be explained in further detail with reference to illustrative preferred embodiments depicted in the accompanying drawings in which:

FIG. 2 is a sectional view through an alternate air intake filter embodiment according to the invention; and FIG. 3 is an end elevation of the air intake filter of FIG. 2.

DETAILED DESCRIPTION OF PREFERRED EMBODIMENTS

Figure 1:
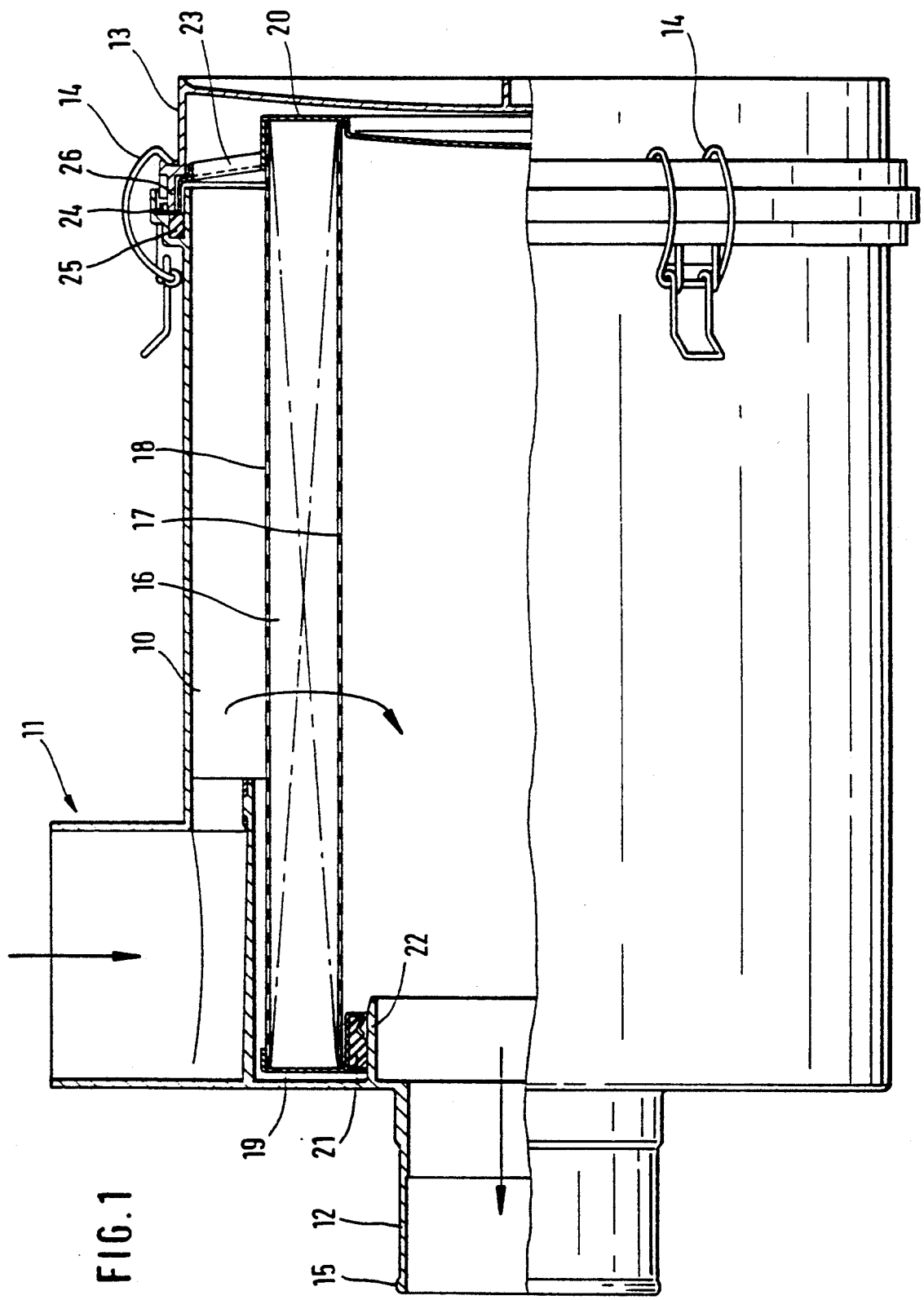
FIG. 1 is a sectional view of an air intake filter according to the invention.

The air intake filter shown in FIG. 1 comprises a housing 10 which includes a raw air inlet 11 and a clean air outlet 12. The housing is closed at its end opposite the clean air outlet by a housing cover 13. A plurality of latches 14 disposed around the circumference provide for reliable fastening of the housing cover. The clean air outlet 12 of the housing comprises an outwardly extending tubular projection provided with an annular bead 15 for attaching an air duct or the like. Reference numeral 16 designates a filter insert constructed in a conventional manner of an annulus of pleated filter paper which is disposed between an inner support sleeve 17 and an outer support sleeve 18. The end faces of the filter insert 16 are closed by plates 19 and 20. A radial gasket 21 is disposed on end plate 19. Gasket 21 contacts a concentric ring 22, which extends into the housing, and seals the raw air space from the clean air space at this end of the air intake filter. A radial fixation of the filter insert is produced at this end by the contact between the radial gasket 21 and ring 22.

The other end face of the filter insert is provided with an end plate 20 which simultaneously also provides the separation between the clean air space and the raw air space. At this end the filter insert is provided with tabs 23 which extend outwardly like points of a star from the outer diameter of the filter insert. These tabs are not additional elements of the filter insert, but parts of the end plate, which is configured accordingly. These tabs are formed at their outer end such that they extend into an annular groove 24 on the housing 10. Groove 24 furthermore contains a gasket 25. An annular projection 26 on the housing cover 13 also engages in this annular groove, and the cover is fastened to the housing with the latch 14, which is a conventional wire hook latch. Not only is this type of latch capable of attaching the cover to the housing, but it also simultaneously secures the filter insert radially within the end area of the housing and renders any additional axial fastening unnecessary.

The alternate air intake filter embodiment shown in FIG. 2 likewise comprises a cylindrical housing 27. Housing 27 is fastened to a support 28 by means of screws 29. Raw air enters through the support 28 in the direction of arrow 31 and passes over baffles 30 (axial cyclone) into the raw air chamber of the intake air filter. The filter insert 32 is constructed in a manner similar to filter insert 16 depicted in FIG. 1. At its end adjacent the raw air inlet, it has a radial gasket which contacts a concentric projection 33 and seals the raw air chamber from the clean air chamber. Concentric projection 33 simultaneously constitutes the outlet for the clean air which is carried to the intake manifold of the engine in a conventional manner.

The housing cover 34 is constructed in the form of a semicylindrical half-shell, in which the right end is closed off by a semicircular portion. A gasket 35 extending around the end of the cover assures that the housing cover, which has a part with a comb-like cross section 36 engaging a mating part of the housing, is fixed in place and effectively sealed. A handle 37 is provided at the top of the housing cover.

At the end of the air intake filter remote from the raw air inlet both the housing and the housing cover are provided with annular grooves 38, 39, respectively. Grooves 38 and 39 together form a circumferential annular groove for receiving a support ring 40 which is fastened to the end plate 41 of the filter insert 32.

A dust discharge outlet 42 is provided in the bottom portion of the housing 27. Such dust outlets are conventional and need not be described in further detail.

The attachment of the housing cover to the housing is illustrated in FIG. 3. On the housing 27 are fastening elements 43 with which wire loop (bow) latches 44 are associated. These wire loop latches engage recesses 45 on the housing cover and can be moved to a locking position in these recesses. Wire loop latches of this type are disposed on the air intake filter in the vicinity of the raw air inlet, as well as at the other end of the filter. Thus, a total of four wire loop latches are needed. If the filter insert is to be replaced, it is necessary to release the wire loop latches 44. The housing cover can be removed and the filter insert is grasped lightly at one end, shifted axially away from the raw air inlet, and then lifted upward and out. The installation of a new filter insert is performed in reverse sequence.

The arrangement of the annular groove 38-39, which is engaged by the support ring 40, assures that the filter insert will assume a correct axial position when it is installed. Should it happen that the filter insert or the support ring 40 does not lie in the annular groove 38, 39—e.g., due to improper insertion—, then the housing cover cannot be mated with the housing and fastened. Therefore, the construction of the annular groove 38-39, assures that the filter insert 32 will always be installed correctly in the filter housing and consequently assures that the required seal between the raw air side and the clean air side will be provided.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An air intake filter for an internal combustion engine, said filter comprising a substantially cylindrical housing having a raw air inlet and having a clean air outlet at one end face thereof, and at least one annular filter insert disposed within said housing through which air flows radially from the outside to the inside, wherein said housing is composed of first and second half-shells joined by releasable latch means, said first half-shell carrying said one end face with said clean air outlet, and said a second half-shell forming a cover, wherein said housing has an annular indentation formed interiorly in said first and second half-shells extending around the entire circumference of said housing, and said filter insert is provided with an annular bead extending around its entire circumference which engages said annular indentation to secure said filter insert radially and axially within said housing; said indentation and annular bead being arranged such that if the filter element is incorrectly installed, they will prevent closure of said cover.

2. An intake filter according to claim 1, wherein said annular indentation is provided in said cylindrical housing adjacent its end face remote from said air outlet.

3. An air intake filter according to claim 1, further comprising a plurality of latch members for securing said first and second half-shells together.

4. An air intake filter according to claim 3, wherein said latch members comprise wire hook latches on said first half-shell engageable in recesses in said cover.

5. An air intake filter according to claim 1, wherein said filter insert carries a radial gasket at its end adjacent said clean air outlet, and said radial gasket contacts a tubular projection which communicates with said clean air outlet and extends into said housing, to seal a raw air chamber from a clean air chamber within said filter.

6. An air intake filter for an internal combustion engine comprising:
   a substantially cylindrical housing having a raw air inlet and having a clean air outlet at one end face thereof with an inwardly extending tubular projection communicating with said air outlet; and
   an annular filter insert through which air flows radially from the outside to the inside, said filter insert having an outlet opening in one end face thereof provided with a radial seal and having a closure plate on the other end thereof, and said filter insert being disposed in said housing with said housing extending longitudinally of said filter insert and with said tubular projection received in said outlet opening with said radial seal in sealing contact therewith and with said filter insert being axially displaceably arranged on said tubular projection;
   wherein said housing is provided with an opening through which said filter insert may be inserted into and removed from said housing, with a cover member for closing said housing opening, with latch means for releasably securing said cover member to said housing to close said housing opening, and with securing element receiving means, and
   wherein said filter element is provided with at least one radially outwardly projecting securing element adjacent said other end, each said securing element being received in said securing element receiving means for securing said filter insert axially and radially within said housing.

7. An air intake filter according to claim 6, wherein said cover and said housing form a junction when said housing opening is closed by said cover, and said at least one securing element is engaged by said junction between said housing and said cover, whereby said filter insert is secured in place by fastening said cover to said housing.

8. An air intake filter according to claim 7, wherein said securing element comprises a plurality of radially extending tabs each of which is engaged in the junction between said housing and said cover.

9. An air intake filter according to claim 7, wherein said securing element is an annular plate which is engaged around its entire circumference in the junction between said housing and said cover.

10. An air intake filter according to claim 7, wherein said latch means comprises a plurality of latch members for securing said cover to said housing.

11. An air intake filter according to claim 10, wherein said latch members comprises wire hook latches on said housing engageable in recesses in said cover.

* * * * *